United States Patent
Meinke et al.

(10) Patent No.: US 9,525,214 B2
(45) Date of Patent: Dec. 20, 2016

(54) POWER TRANSMISSION SYSTEMS AND COMPONENTS FOR DIRECT CURRENT APPLICATIONS

(75) Inventors: Rainer Meinke, Melbourne, FL (US); Sasha Ishmael, Raleigh, NC (US)

(73) Assignee: Advanced Magnet Lab, Inc., Palm Bay, FL (US)

( * ) Notice: Subject to any disclaimer, the term of this patent is extended or adjusted under 35 U.S.C. 154(b) by 763 days.

(21) Appl. No.: 13/877,771

(22) PCT Filed: Oct. 6, 2011

(86) PCT No.: PCT/US2011/055178
§ 371 (c)(1),
(2), (4) Date: Apr. 4, 2013

(87) PCT Pub. No.: WO2012/048169
PCT Pub. Date: Apr. 12, 2012

(65) Prior Publication Data
US 2013/0221748 A1    Aug. 29, 2013

Related U.S. Application Data

(60) Provisional application No. 61/390,787, filed on Oct. 7, 2010.

(51) Int. Cl.
*H02J 3/00*     (2006.01)
*H01R 3/00*    (2006.01)
(Continued)

(52) U.S. Cl.
CPC . *H01R 3/00* (2013.01); *H02J 1/00* (2013.01); *H02J 3/00* (2013.01); *H02K 13/00* (2013.01);
(Continued)

(58) Field of Classification Search
CPC ........ Y02E 40/60; Y02E 40/64; Y02E 40/647; Y02E 40/648; Y02E 40/67; Y02E 40/641
(Continued)

(56) References Cited

U.S. PATENT DOCUMENTS 2,121,593 A * 6/1938 Hague ................... H02K 31/02
310/178
3,414,662 A * 12/1968 Klein ..................... H01B 12/02
174/15.5
(Continued)

OTHER PUBLICATIONS

Feasibility Study of Low-Voltage DC Superconducting Distribution System; IEEE Transactions on Applied Superconductivity, vol. 15, No. 2, Jun. 2005. Mitsuho Furuse et al.*
(Continued)

*Primary Examiner* — Fritz M Fleming
(74) *Attorney, Agent, or Firm* — Stephen C. Thomas; Ferdinand M. Romano

(57) ABSTRACT

A power conversion and distribution system. In one embodiment low voltage source components convert a high voltage AC power source to a relatively low voltage supply and provide a direct current output. First superconductor wires carry current from the low voltage source components to a load, and second superconductor wires carry current from the load to the low voltage source components. Individual ones of the first wires are grouped with individual ones of the second wires so that wires connected to carry current in opposite directions are in such sufficiently close proximity that additives of self-fields generated by individual ones of the wires during power transmission result in reduction of the magnetic fringe field generated, thereby increasing the current carrying capacity of the wires.

4 Claims, 9 Drawing Sheets

(51) Int. Cl.
*H02K 13/00* (2006.01)
*H02K 47/04* (2006.01)
*H02K 47/14* (2006.01)
*H02J 1/00* (2006.01)
*H02K 55/00* (2006.01)
*H02K 7/18* (2006.01)

(52) U.S. Cl.
CPC .............. *H02K 47/04* (2013.01); *H02K 47/14* (2013.01); *H02J 2001/002* (2013.01); *H02K 7/1838* (2013.01); *H02K 55/00* (2013.01); *Y02E 40/62* (2013.01); *Y10T 307/406* (2015.04)

(58) Field of Classification Search
USPC .................... 174/125.1; 307/64–66; 505/163
See application file for complete search history.

(56) References Cited

U.S. PATENT DOCUMENTS

| | | | |
|---|---|---|---|
| 3,720,777 A | * | 3/1973 | Sampson et al. ........ D04C 1/02 174/15.5 |
| 4,791,850 A | | 12/1988 | Minovitch |
| 5,146,383 A | * | 9/1992 | Logan .................... H01F 6/003 361/141 |
| 6,043,577 A | | 3/2000 | Bornemann |
| 6,275,365 B1 | | 8/2001 | Kalsi et al. |
| 6,750,588 B1 | | 6/2004 | Gabrys |

OTHER PUBLICATIONS

DC Loop Type Superconducting Distribution System Including Various Distributed Generations; IEEE Transactions on Applied Superconductivity, vol. 17, No. 2, Jun. 2007. Yushi Miura et al.*

* cited by examiner

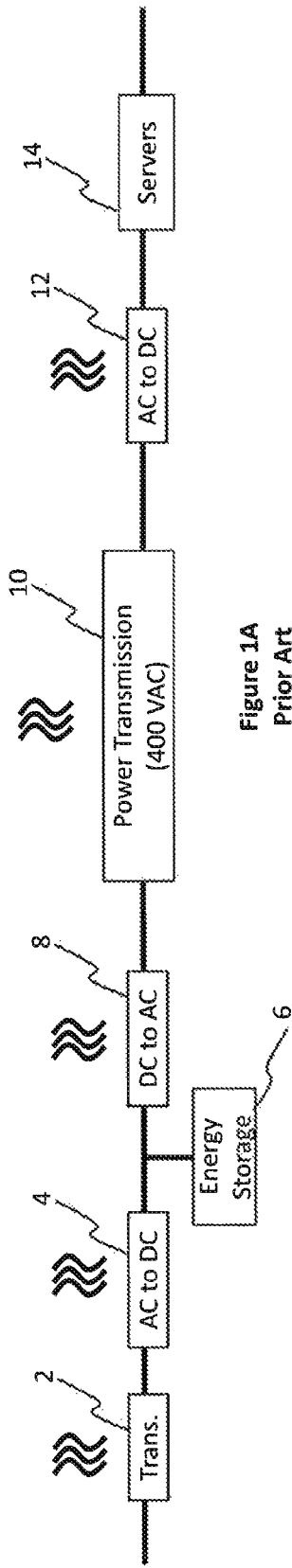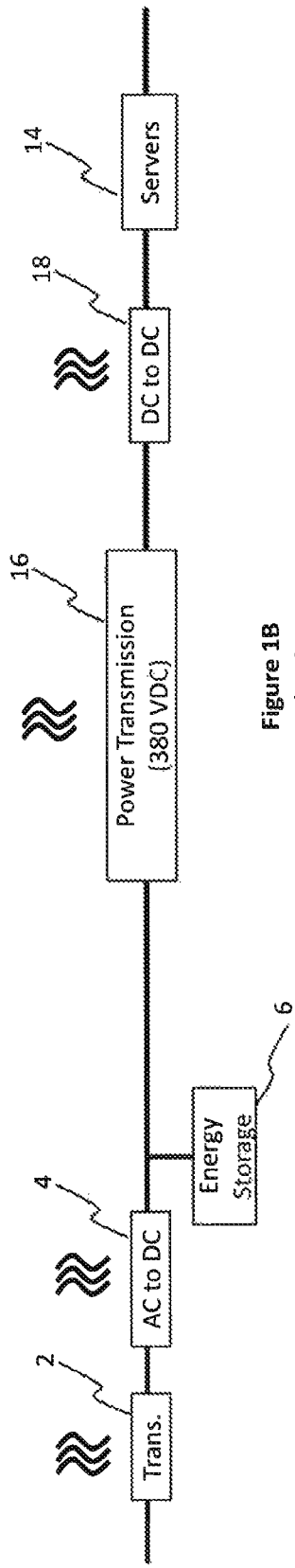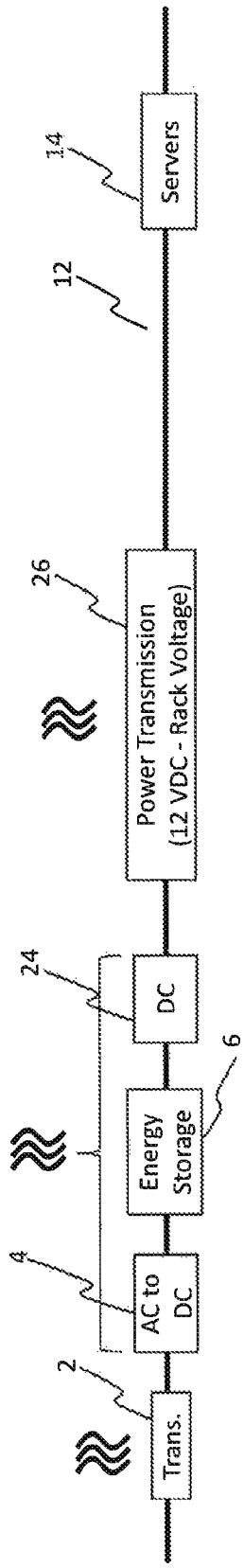

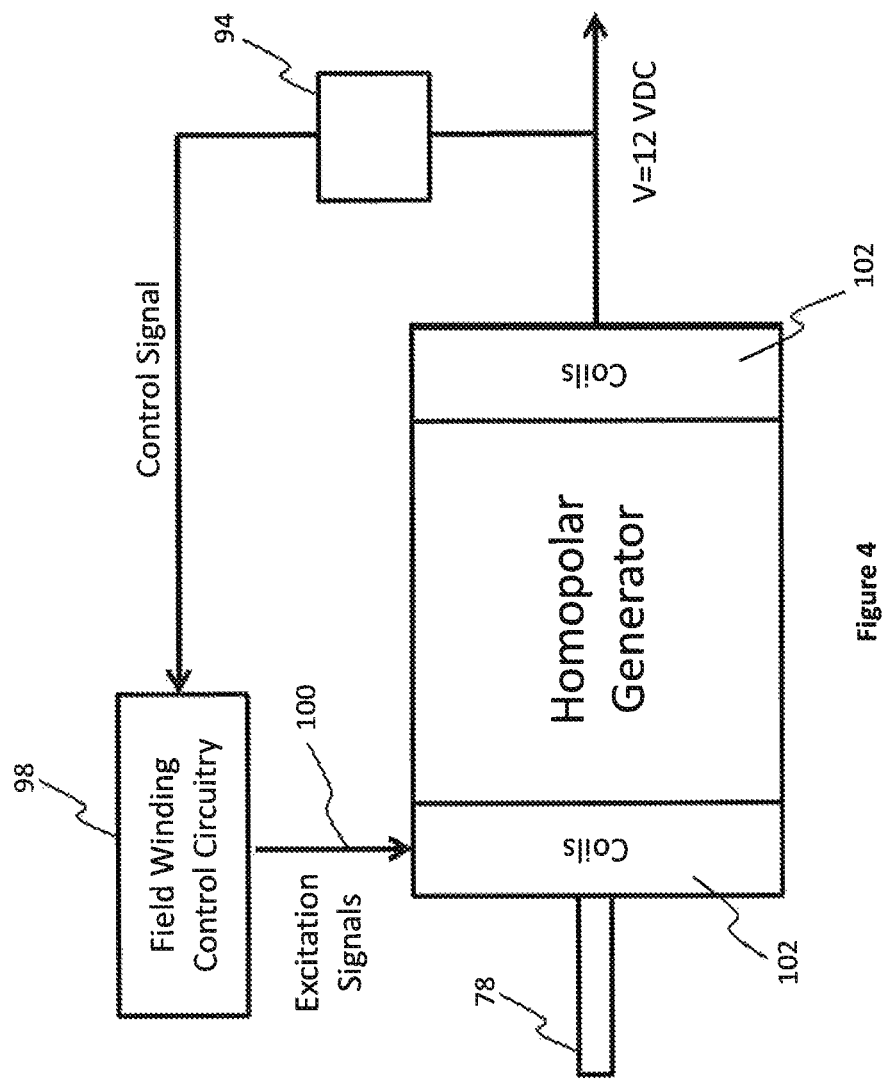

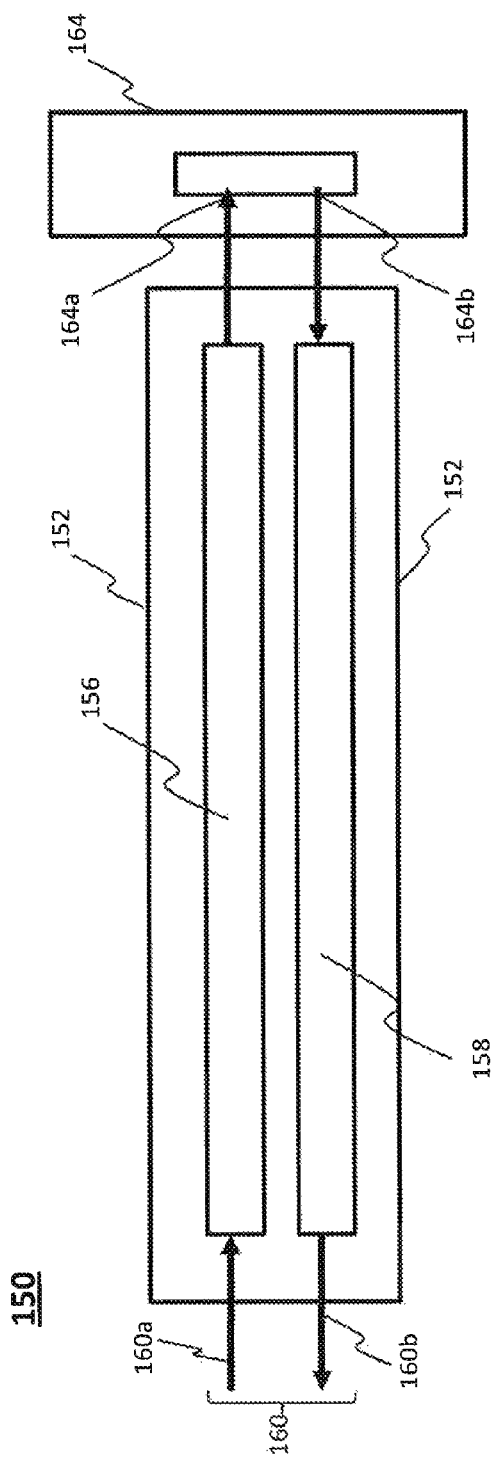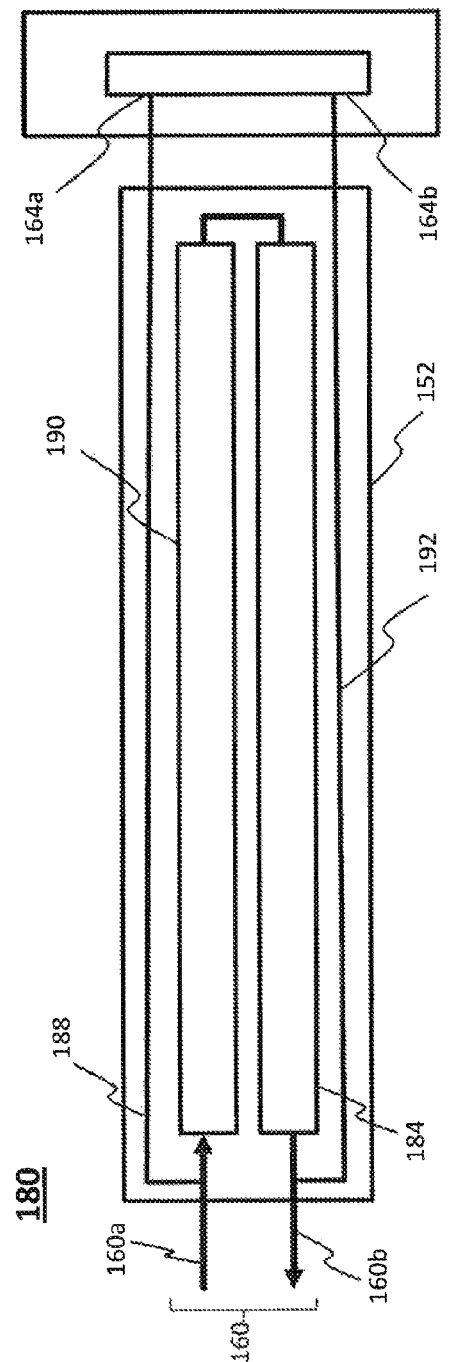
Figure 6A
Figure 6B

POWER TRANSMISSION SYSTEMS AND COMPONENTS FOR DIRECT CURRENT APPLICATIONS

PRIORITY BASED ON RELATED APPLICATION

This application claims priority based on International Patent Application PCT/US2011/55178 filed Oct. 6, 2011 and U.S. Provisional Application No. 61/390,787 filed Oct. 7, 2010.

FIELD OF THE INVENTION

The present invention relates to electrical systems and associated methods of operation, including systems for transmitting electric power. More particularly, embodiments of the present invention relate to power conversion and distribution systems, including homopolar generator systems, and transmission line circuitry for conducting power from a source to a load.

BACKGROUND

Transmission associated with electric power generation and consumption typically requires a series of power conversion steps which add to the cost and reduce the efficiencies of operations. The conventional transmission path typically includes a high voltage alternating current (AC) segment, typically on the order of 14 KV, followed by one or more voltage reductions or step downs. Depending on the specific application, there may be multiple voltage conversions and multiple conversions between direct current (DC) and AC. Some power delivery systems rely on AC transmission over relatively short distances to reduce losses. Those segments may carry power at 300 to 400 Volts or higher. Frequently the service is delivered to residential and business environments via a further step down of AC. Subsequently, components of individual appliances perform further voltage conversions to meet requirements. For example, many electronic appliances include power supplies or charging units that convert power to DC at a specified voltage. While it is widely recognized that individual conversions involve inefficiencies, these are typically tolerated because they are on an individual basis, the associated costs are small and the costs are not separately identified to the consumer.

On the other hand, when the service is delivered to commercial/industrial complexes that utilize large amounts of power in similar DC applications, the inefficiencies of power conversions can be taken into consideration by optimizing the design for power transmission and distribution. Nonetheless, even with economies of scale, there have been limited means for improving the efficiency of power delivery. This is partly due to the number of conversions required to deliver power of the correct form factor to DC inputs. Both the transformers and the AC-DC semiconductor converters used in these systems have losses which can only be avoided by eliminating the voltage transformations. Yet it has been necessary to employ multiple conversions in order to optimize overall efficiencies. This is particularly true for segments which transmit power from high voltage distribution points within a commercial complex to locations of power consumption. An additional transformation is often required to implement energy storage devices into these systems. In many cases batteries are used for energy storage which requires a relatively low voltage DC feed. The incoming AC is converted to a low voltage DC power. The batteries are connected at the DC side and then the power is converted back to AC at a higher voltage for low loss power transmission.

Data centers are exemplary of power applications for which the inventive concepts are suited. The term data center refers to the wide variety of complexes which house servers to make readily available information systems and/or large volumes of data for access. The information may be commercial in nature, e.g., credit card data, travel reservation systems, or personal, including email and pictures stored on a server. Small data centers may be housed within conventional office buildings. Larger data centers may be in specifically designed buildings.

In some contexts such data centers are referred to as server farms or Internet Data Centers. In addition to containing large amounts of electronic equipment, data centers include a variety of back-up equipment and cooling equipment for controlling temperature and humidity of the server environment.

As the size of individual data centers grows, as measured by the number of servers in use, power requirements will continue to increase. A typical data center may occupy ten to one hundred thousand square feet and consume megawatts of power. It has been estimated that data centers in the United States presently consume approximately three percent of all electric power generated in the United States. The global market for only the power and cooling components used in data centers worldwide may already exceed forty billion U.S. Dollars annually. Continued growth is expected.

Design of power distribution systems within data centers is made more complex than other industrial power applications because of the demand for high levels of reliability. For example, distribution systems within a data center complex will commonly incorporate alternate power sources, as well as devices which store energy to provide power for brief periods when there are needs to transition from a disrupted supply of power to a secondary source of power.

An exemplary prior art power distribution system which primarily utilizes AC transmission is shown in FIG. 1A. A trunk line brings in high voltage (e.g., 14 kV) power to a transformer 2 which steps the voltage down to within the range of 200 to 500 volts. Energy storage, located at a central point before distribution branches, typically requires a conversion 4 of the AC power to DC power. The subsequent energy storage 6 may be in the form of an Uninterruptible Power Supply (UPS). Batteries in the UPS are charged with incoming power after an initial AC to DC conversion. The DC output from the UPS then undergoes a conversion 8 to a high voltage AC supply for transmission 10 within the data center, e.g., on the order of 50 m, in order to minimize losses in subsequent segments of the distribution system as the power is delivered to clusters of servers. When the service is delivered to a point local to a cluster of server racks, the power undergoes still another conversion 12 to provide the relatively low voltage, high current source DC input needed to power the servers 14 in the cluster. A typical cluster of forty server racks may draw over two megawatts of power.

The power distribution system of FIG. 1A experiences significant losses resulting from at least three conversions between AC and DC power and reductions or step-ups to levels which are suitable for transmission or input to an array of different low voltage devices. Each conversion generates heat which must be removed from the data center in order to control the environment for reliable equipment operation.

The cost of power transmission inefficiencies are compounded by power demands necessary for cooling and humidity control.

Another exemplary power distribution system, shown in FIG. 1B, has an initial segment like that of the system shown in FIG. 1A, converting the high voltage (e.g., 14 KV) power received from the trunk line with a transformer 20 which steps the voltage down to within the range of 200 to 500 volts. This is followed by a conversion 4 of the AC power to DC power. Energy storage 6, such as a UPS is located at a central point before power distribution branches. Instead of converting the DC output from the UPS, the DC power undergoes DC transmission 16 directly to a point in the proximity of clusters of servers 14. At a point local to each cluster of servers 14 there is a DC to DC voltage step down 18 to meet input requirements of the equipment. Such an AC DC distribution arrangement still requires multiple conversions, but can be more energy efficient than the system of FIG. 1A.

Losses can be further reduced when the power distribution system incorporates a UPS that outputs a DC voltage consistent with the input voltage needed at the servers, e.g., 12 volts.

Such an arrangement, as illustrated in FIG. 1C, has an initial segment like that of the system shown in FIGS. 1A and 1B, having a transformer 2 convert high voltage (e.g., 14 KV) power received from a trunk line down to the range of 200 to 500 volts. This is followed by a conversion 4 of the AC power to DC power. Energy storage 6, provided with a UPS, is located at a central point before power distribution branches. The UPS provides as an output a DC voltage 24 suitable for input to the servers 14 in a cluster prior to transmission 26 to the servers 14. This arrangement requires that the segment of transmission path over which the low voltage DC power is carried be relatively short in order to avoid significant losses.

BRIEF SUMMARY OF THE INVENTION

According to one series of embodiments there is provided a power conversion and distribution system. A motor is positioned to convert a high voltage power signal to mechanical energy with a homopolar generator coupled to convert the mechanical energy into DC power. A transmission line is positioned to deliver the DC power to a power consuming device.

In another embodiment a homopolar generator system incorporates feedback voltage control. The system includes a homopolar generator which provides a DC output signal. Difference circuitry provides a signal based on a difference between a desired DC output from the generator and an actual DC output the generator 64. Field winding control circuitry is responsive to the control signal to adjust flux density of one or more field windings in the generator to stabilize the DC output voltage of the generator.

There is also provided transmission line circuitry for conducting power from a source to a load. A first solenoid coil is coupled between a first terminal of the source and a first terminal of the load. A second solenoid coil is coupled between a second terminal of the source and a second terminal of the load. The first and second solenoid coils carry substantially all of the power from the source to the load.

A related method for transmitting power from a source to a load and for providing superconducting magnetic energy storage includes positioning a first solenoid coil between a first terminal of the source and a first terminal of the load and positioning a second solenoid coil between a second terminal of the source and a second terminal of the load. The first and second solenoid coils carry substantially all of the power from the source to the load and store energy.

In another embodiment transmission line circuitry for conducting power from an electric power source to a load includes first and second solenoid coils connected in series between first and second terminals of the source. A first superconducting transmission line is connected between the first terminal of the source and a first terminal of the load. A second superconducting transmission line is connected between the second terminal of the source and a second terminal of the load. The first and second transmission lines and the load form a circuit path in parallel with the first and second solenoid coils.

In a method for conducting power from an electric power source to a load, power is transmitted through a first superconducting transmission line connected between a first terminal of the source and a first terminal of the load. Power is also transmitted through a second superconducting transmission line connected between a second terminal of the source and a second terminal of the load. First and second solenoid coils are connected in series between the first and second terminals of the source. The first and second transmission lines and the load form a circuit path in parallel with the first and second solenoid coils.

According to another embodiment of the invention transmission line circuitry is provided for conducting current from an electric power source to a load and back to the power source. The circuitry includes a cryostat. A first plurality of superconducting transmission lines extend within the cryostat, each connected between a first terminal of the source and a first terminal of the load. A second plurality of superconducting transmission lines extend within the cryostat, each connected between a second terminal of the source and a second terminal of the load. Individual ones of the first plurality of lines and individual ones of the second ones of the lines are arranged next to one another to form an array comprising a plurality of pairs so that when current is transmitted through the lines current flows through different lines in a pair are in different directions.

According to another embodiment transmission line circuitry is provided for conducting current from an electric power source to a load and back to the power source. The circuitry includes a cryostat. A first plurality of superconducting transmission lines extends within the cryostat, each connected between a first terminal of the source and a first terminal of the load. A second plurality of superconducting transmission lines extends within the cryostat, each connected between a second terminal of the source and a second terminal of the load. The system includes a series of support structures in spaced apart positions along the cryostat which constrain the conductors.

DESCRIPTION OF THE FIGURES

FIGS. 1A, 1B and 1C illustrate prior art power distribution systems;

FIG. 4 illustrates an embodiment where a homopolar generator system incorporates feedback voltage control;

FIGS. 6A and 6B illustrate embodiments of the invention which integrate a Superconducting Magnetic Energy Storage system into a power transmission line;

In accord with common practice, the various described features may not be drawn to scale, but are drawn to emphasize specific features relevant to the invention. Like reference characters denote like elements throughout the figures and text.

DETAILED DESCRIPTION OF THE INVENTION

Before describing in detail exemplary systems and methods relating to the invention, it should be observed that the present invention resides primarily in a novel and non-obvious combination of elements and method steps. So as not to obscure the disclosure with details that will be readily apparent to those skilled in the art, certain conventional elements and steps have been presented with lesser detail, while the drawings and the specification describe in greater detail other elements and steps pertinent to understanding the invention. Also, the following embodiments are exemplary constructions which do not define limits as to structural arrangements or methods according to the invention. The embodiments are permissive rather than mandatory and are illustrative rather than exhaustive.

1. AC-DC and DC-DC Conversion with Built-in Energy Storage

Figure 2:
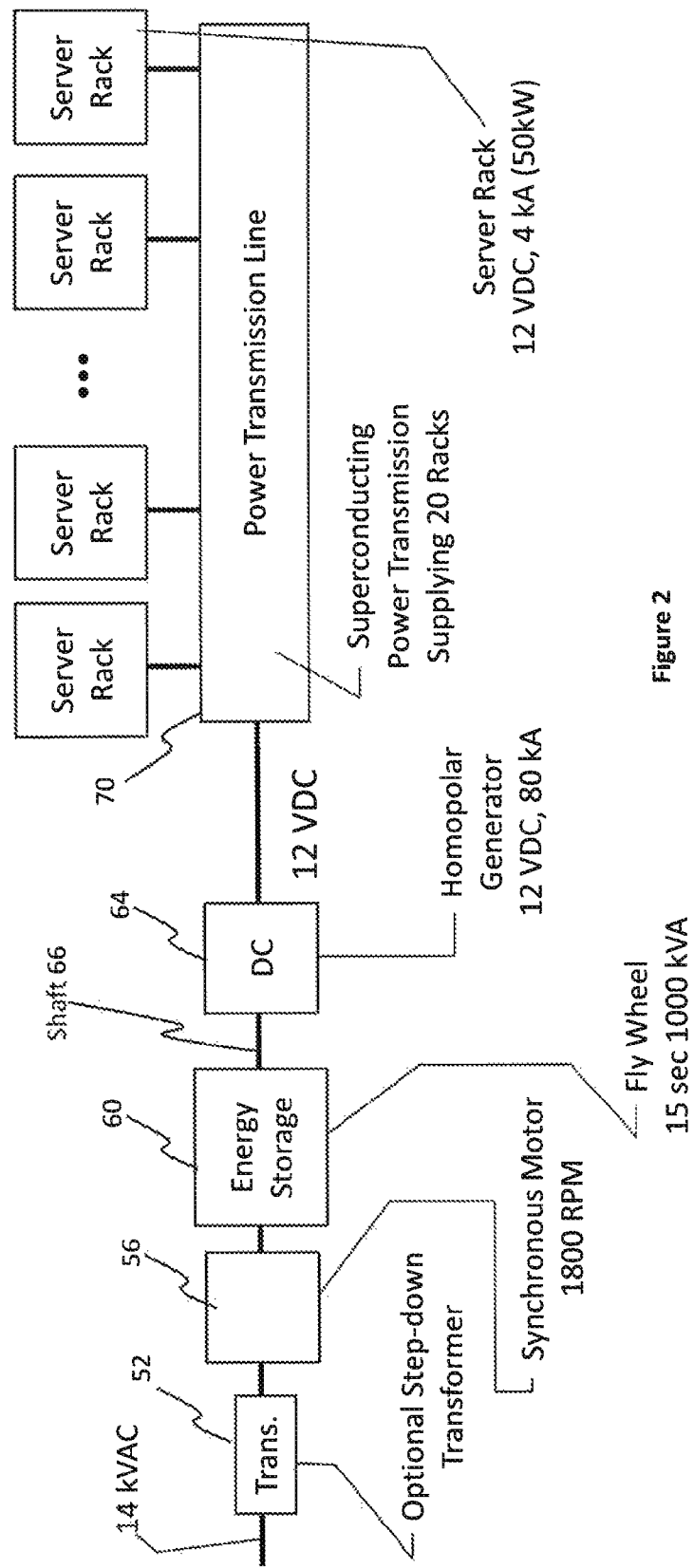
FIG. 2 illustrates a power distribution system 50 according to an embodiment of the invention.

FIG. 2 illustrates a power distribution system 50 according to an embodiment of the invention. In lieu of incorporating multiple conversions to step down voltages and convert between AC and DC power, the system of FIG. 2 performs electromechanical conversions. In this example, a transformer 52 steps down a 14 KV AC trunk line voltage to 400 volts. The 400 volt signal is then used directly to turn a synchronous motor 56 designed to generate torque at 1800 RPM. The synchronous motor 56 is coupled to an energy storage device 60 and a homopolar generator 64 via a common shaft 66 for transfer of mechanical energy. In lieu of an electronic, battery-based UPS, the energy storage device 60 is a fly wheel. By way of example, the flywheel 60 may be designed to store sufficient energy for the homopolar generator 64 to generate one thousand kW for 15 seconds. Based on the energy that is to be stored at a given RPM the moment of inertia of the flywheel can be calculated. The moment of inertia of the flywheel 60 provides for voltage regulation in that rapid changes in supply voltage do not result in instantaneous changes in flywheel speed. As a result, the output voltage generated by the homopolar generator 64 will be dampened relative to the surge and the control circuitry can further limit the voltage fluctuation. Although FIG. 2 illustrates a voltage conversion from 14 KV to 400 V, this step down is not necessary. Embodiments of the invention include provision of a synchronous motor coupled to receive such a high voltage, e.g., 14 kV, input directly from the trunk line.

In the embodiment of FIG. 2 the homopolar generator 64 is a superconducting machine, but in other embodiments the generator may be a normal machine. Summarily, the generator 64 converts the torque received from the motor, through the flywheel, to a low voltage, high current (e.g., 12 volt DC, 80 kA) supply which propagates over a superconducting transmission line 70 to multiple racks 74 of servers 14. In this example, the supply may power 20 racks of servers, each rack consuming four kA at 12 VDC.

DC electrical power transmission with superconducting transmission lines according to the system 50 of FIG. 2 is advantageous over transmission of AC power. Conventionally, generators in power plants produce AC power. To employ superconducting transmission lines and avoid losses, the power has to be converted to direct current. Multiple embodiments of the invention enable provision of DC power at the desired voltage with fewer voltage conversions than previously known. Use of a flywheel for energy storage avoids the AC to DC conversion losses associated with energy storage. Conversion of energy from the turning flywheel to direct current with the homopolar generator advantageously avoids another voltage—voltage conversion, providing relatively efficient transformation of fly wheel energy to a desired DC voltage level.

The DC output of the homopolar generator 64 of FIG. 2 can be precisely controlled by adjusting the flux density of the field winding. In designs where the field winding of the homopolar generator comprises permanent magnets, field adjustments can be effected by superimposing correction windings. A feature of the invention is that, given a configuration where a synchronous machine is interfaced with a homopolar machine, a mechanical flywheel can be interposed between the synchronous machine and the homopolar machine to store significant amounts of energy.

Figure 3:
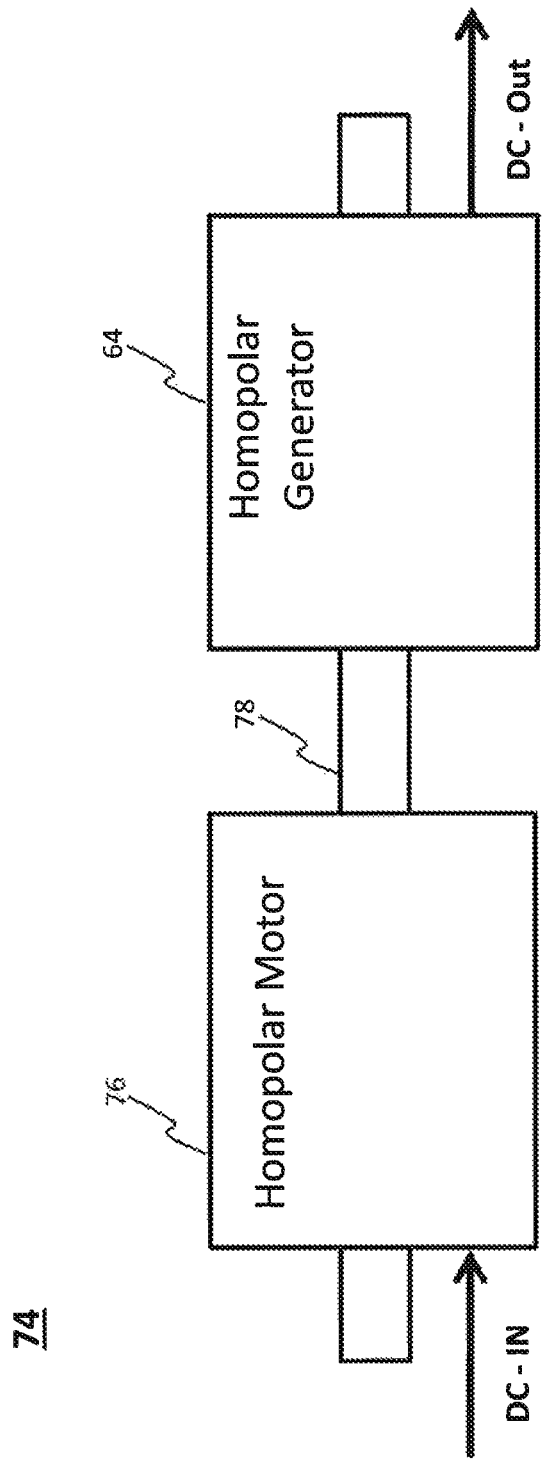
FIG. 3 illustrates an embodiment of the invention wherein an electro-mechanical system includes a homopolar motor to turn a homopolar generator.

According to another embodiment of the invention, the general configuration of an electro-mechanical system 74 is shown in FIG. 3. A homopolar motor 76 is coupled via a shaft 78 to turn a homopolar generator 64. Generally, the motor 76 of FIG. 3 receives a DC input which may result from rectification of an AC signal. The motor 76 turns the shaft 78 in order for the generator 64 to provide a DC output. The arrangement of FIG. 3 also provides isolation from voltage fluctuations such that the DC output is not subject to fluctuations which occur at the input to the motor.

The output voltage level of the generator 64 of the system 74 is controllable by varying the flux density developed by one or more field windings of the homopolar generator, e.g., with supplemental field windings as described for the generator of FIG. 2. See FIG. 4 which illustrates a portion of a homopolar generator system 90 incorporating feedback voltage control.

The system 90 comprises the homopolar generator 64 and an exemplary feedback control arrangement suitable for controlling and stabilizing the homopolar generator output voltage, V, for the embodiments of FIGS. 2 and 3. Difference circuitry 94 senses the output voltage, V, from the generator 64 and generates a control signal 96 based on the difference between an exemplary desired 12 volt DC output and the actual output, V, from the generator 64. Field winding control circuitry 98 receives the control signal 96 and in response thereto provides a current excitation signal 100 to coils 102 in the generator to adjust the flux density of one or more field windings in the generator 64. With incorporation of such a feedback control system in the electro-mechanical system 74, the DC output voltage can be suitably stabilized.

The inventive concepts so far described are applicable to numerous forms of power generation. Wind power generation is exemplary. Normally, a wind turbine propeller is coupled to a synchronous machine to generate an AC power output. A DC conversion is then required since the AC signal has a low, variable frequency due to fluctuations in wind speed. Typically the frequency needs to be increased to a stable value, e.g., 60 Hz, for compatibility with a power grid.

Conventionally, the variable frequency AC power generated by a wind turbine is first rectified and is then converted to AC at the desired frequency. According to another embodiment, instead of generating variable frequency AC power, the propeller of the wind turbine is coupled to turn a homopolar generator 64 instead of a generator of the type which outputs a variable frequency AC signal. Power losses due to rectification, e.g., about ten percent, are thereby avoided. When the wind power generator has a dedicated application, instead of providing input to a commercial power grid, the output from the generator may be adjusted to meet specific input requirements of equipment. In other cases, the generator output may be coupled directly to a DC power transmission line for efficient delivery to equipment.

Figure 5A:
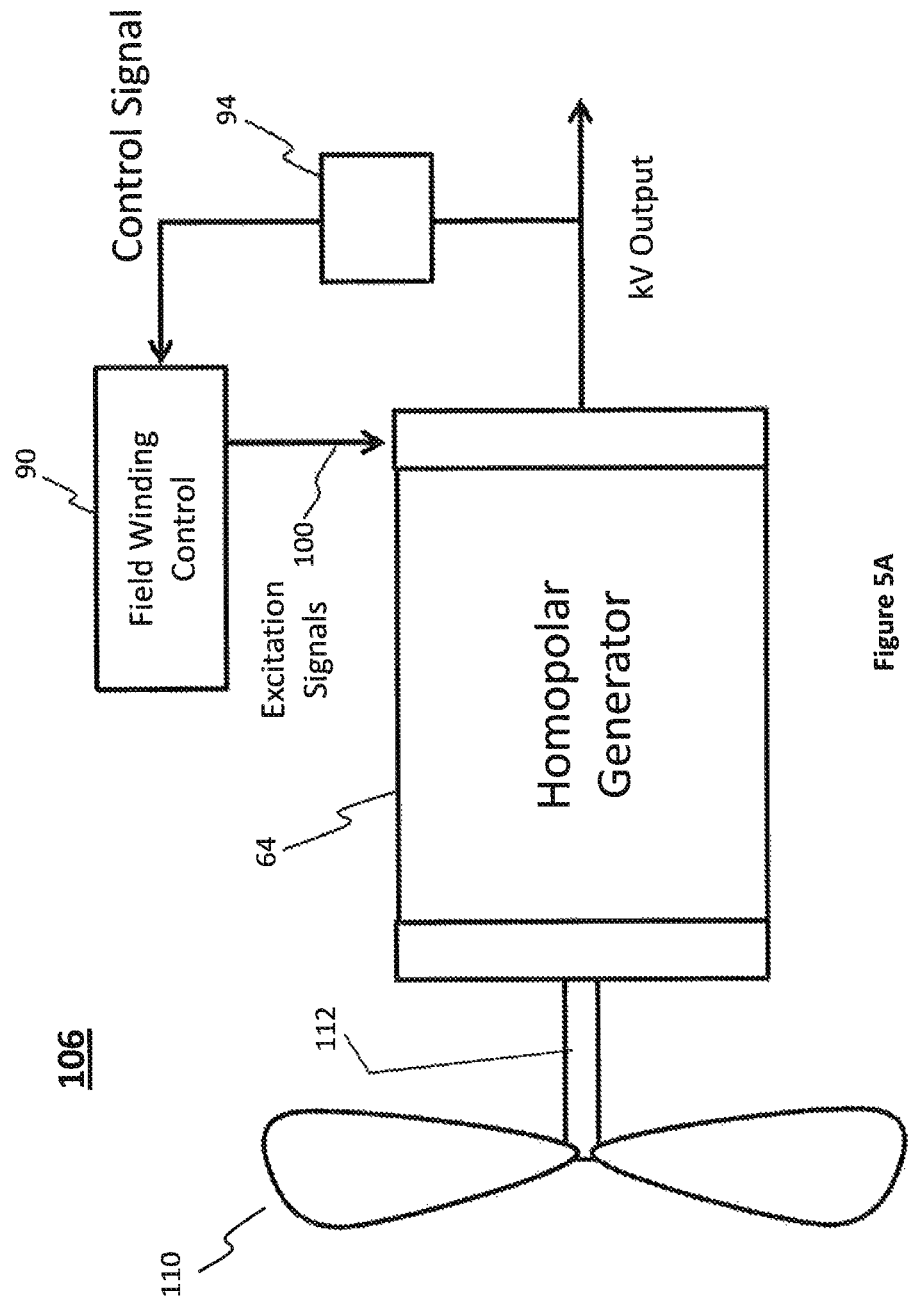
FIG. 5A illustrates a system according to another embodiment wherein a wind propeller is coupled via a shaft to turn a homopolar generator.

FIG. 5A illustrates a system 106 wherein a wind propeller 110 is coupled via a shaft to turn a homopolar generator. Commonly, wind turbines are designed for application where wind speeds vary from about 10 to 40 mph. When coupled to a synchronous generator this speed variation results in an AC frequency fluctuation proportional to the fluctuations in wind speed. When the propeller is coupled to the homopolar generator 64 as shown in FIG. 5A, the uncontrolled DC output voltage will also vary as a function of the wind speed. A control circuit such as illustrated in FIG. 4 can be implemented in conjunction with the power conversion of the homopolar generator to stabilize the output voltage. Further, the homopolar generator can be designed to output a relatively high DC voltage for transmission, e.g., one to two kV. That is, the homopolar generator may comprise the voltage control system of FIG. 4, understanding that the voltage may be stabilized to a value on the order of one to two kV or more, instead of 12 VDC.

Figure 5B:
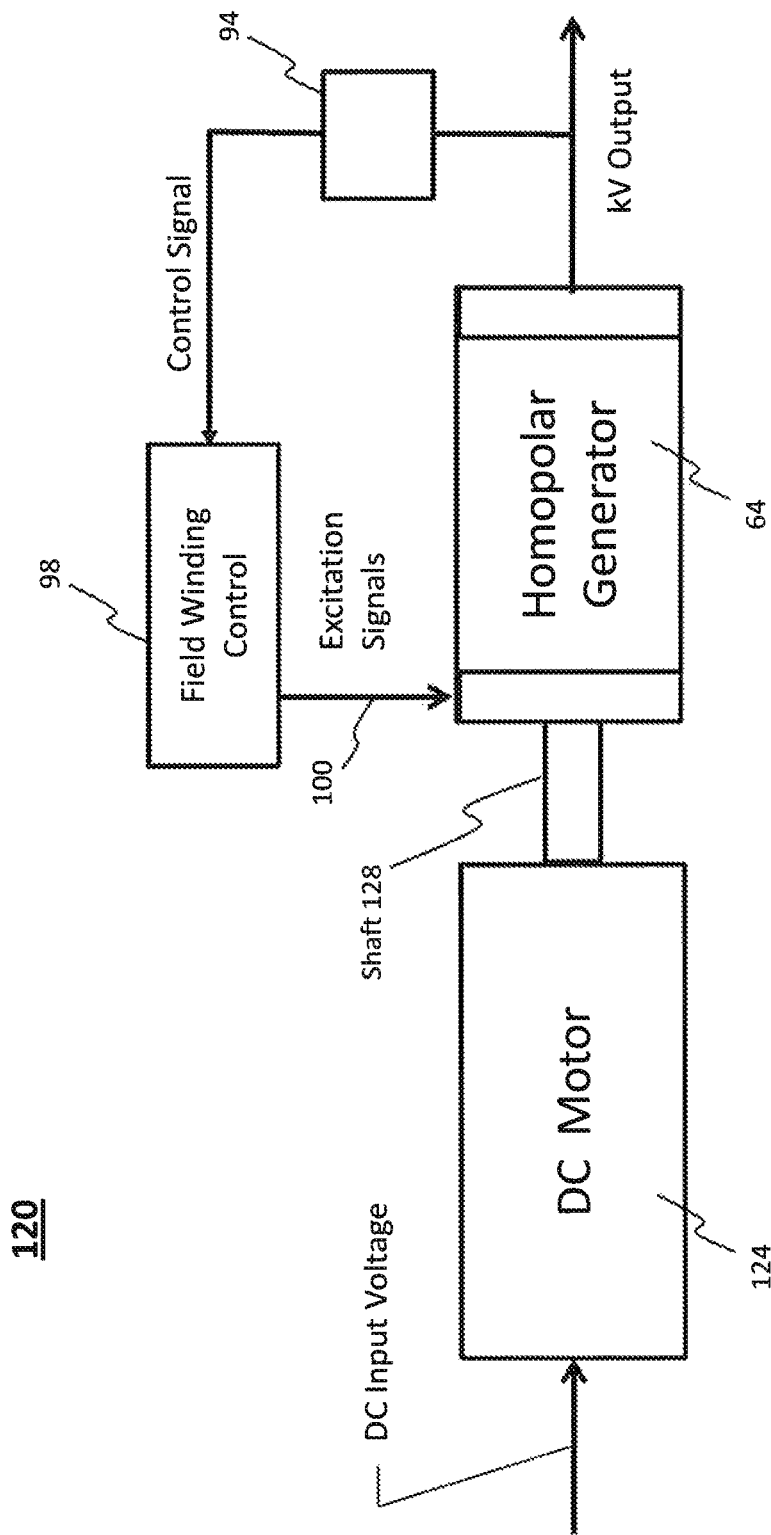
FIG. 5B illustrates an electro-mechanical system according to another embodiment which provides a low loss DC to DC transformation.

FIG. 5B illustrates an electro-mechanical system 120*e* providing a low loss DC to DC transformation wherein a DC input of arbitrary current and voltage (e.g., from the generator 64 of the system 106) feeds a DC motor 124, which may be a homopolar motor. The motor shares a common drive shaft 128 with a homopolar generator 64. The field of the homopolar generator 64 can be adjusted over a potentially wide range, e.g., 0.05 Tesla to 5 Tesla, with a control circuit similar in function to that shown in FIG. 4, thereby providing an adjustable voltage transformation, this resulting in a DC output of desired current and voltage.

2. Intrinsically Stabilized Superconducting DC Power Transmission

Superconducting DC high power transmission lines offer significant advantages over AC transmission lines since large DC power levels can be transmitted with insignificant losses. However, stabilization of voltage and avoidance of power interruptions are important considerations for most of these applications. FIGS. 6A and 6B each illustrate integration of a SMES (Superconducting Magnetic Energy Storage) system directly into a power transmission line. Such integration reduces complexity and cost compared to a stand-alone SMES system. According to another embodiment of the invention, the system 150 of FIG. 6A includes a single cryostat 152 which integrates a SMES system with a power transmission line. This is accomplished by placing a pair of magnetic solenoid coils 156, 158 in line between a pair of power source terminals 160*a*, 160*b* and two terminals 164*a*, 164*b* of a load 164. Part or all of a superconducting transmission line is configured as a coil pair whose large inductance stabilizes the line current between the source 160 and the load 164. The coils 156, 158 are shown in an arrangement where each is connected between a different terminal of the source 160 and the load 164. The coil 156 is connected between the source terminal 160*a* and the load terminal 164*a* while the coil 158 is connected between the source terminal 160*b* and the load terminal 164*b*. If the solenoid coils are large enough they will continue to provide current for a sufficient time period so as to function as a short term power back-up system, in lieu of a UPS, while a transition is made to an alternate power source.

FIG. 6A illustrates the SMES functionality integrated into a power transmission line which may be used as the power transmission line 70 of FIG. 2. The two solenoid coils 156, 158, each having approximately the same length, provide the current path in both directions between the superconducting homopolar generator and multiple clusters of servers 14 which constitute the load 164.

According to another embodiment the system 180 of FIG. 6B also illustrates a SMES integrated into a power transmission line which may be used as the Power Transmission Line 70 of FIG. 2. However, the two solenoid coils 156, 158 shown in FIG. 6B are connected to one another in a series circuit arrangement, each having approximately the same length, together providing a superconducting magnetic energy storage (SMES) circuit 184 between the pair of terminals 160*a*, 160*b* of the source 160. The SMES circuit 184 is a circuit path in parallel with a load circuit path 188 comprising (i) the load 160, (ii) a first transmission line 190 connected between the source terminal 160*a* and the load terminal 160*a* and the load terminal 164*a*, and (iii) a second transmission line 192 connected between the source terminal 160*b* and the load terminal 164*b*.

According to both the system embodiment of FIG. 6A and the system embodiment of FIG. 6B, in the event of a power interruption the SMES provides a source of current to the load for a limited time period, e.g., while the system is transitioning to an alternate source of power. In both embodiments it is contemplated that each solenoid will comprise multiple layers of windings. In such embodiments, the number of layers in the solenoids may be an odd number with the current entering each solenoid at a first end, serially traveling through each layer and then exiting the solenoid at a second end opposite from the first end. In the illustrated embodiments, the two coils 156, 158 have opposing field directions thereby reducing external fringe magnetic fields. A further feature of integrating SMES circuits into DC transmission lines is that the fields are generated with solenoidal windings (as opposed to toroidal configurations), e.g., along a straight axis with a high aspect ratio of axial length to radial dimension. With the solenoids in the pair being positioned close to one another there is a limited fringe magnetic field extending outward.

For the embodiments of FIG. 6A, a typical length of each solenoid, which simultaneously functions as a DC power transmission line, is about 10 m. Two such solenoids are needed to transmit the current back and forth between the source 160 and the load 164. Using solenoids with 300 mm wire diameters and operating them at a field of 5 Tesla stores the energy, E:

$$E \approx \frac{1}{2}\frac{B^2}{\mu_o}V \approx 20 \text{ MWsec}$$

which is about 1 MW for about 20 seconds, where B is the field strength, V is the volume and $\mu_o=4\pi\times10^{-7}$.

3. Power Distribution Busses with High Current Carrying Capacity.

Superconducting busses for high currents require multiple conductors, e.g., which in the case of YBCO are in tape form, running in parallel to achieve the necessary current carrying capacity. Depending on the required current capacity, which can be thousands of amperes, a number of superconducting tapes are needed. The large transport currents on the tapes lead to significant self-fields. These fields get even stronger if several tapes in parallel are needed to accommodate the required current. For a given temperature, the current carrying capacity of the superconductor decreases exponentially with increasing field strength. Since the current carrying capacity of a superconductor is strongly dependent on the surrounding magnetic field, a large self-field will lower the current that can be accommodated by the superconductor.

Figure 7A:
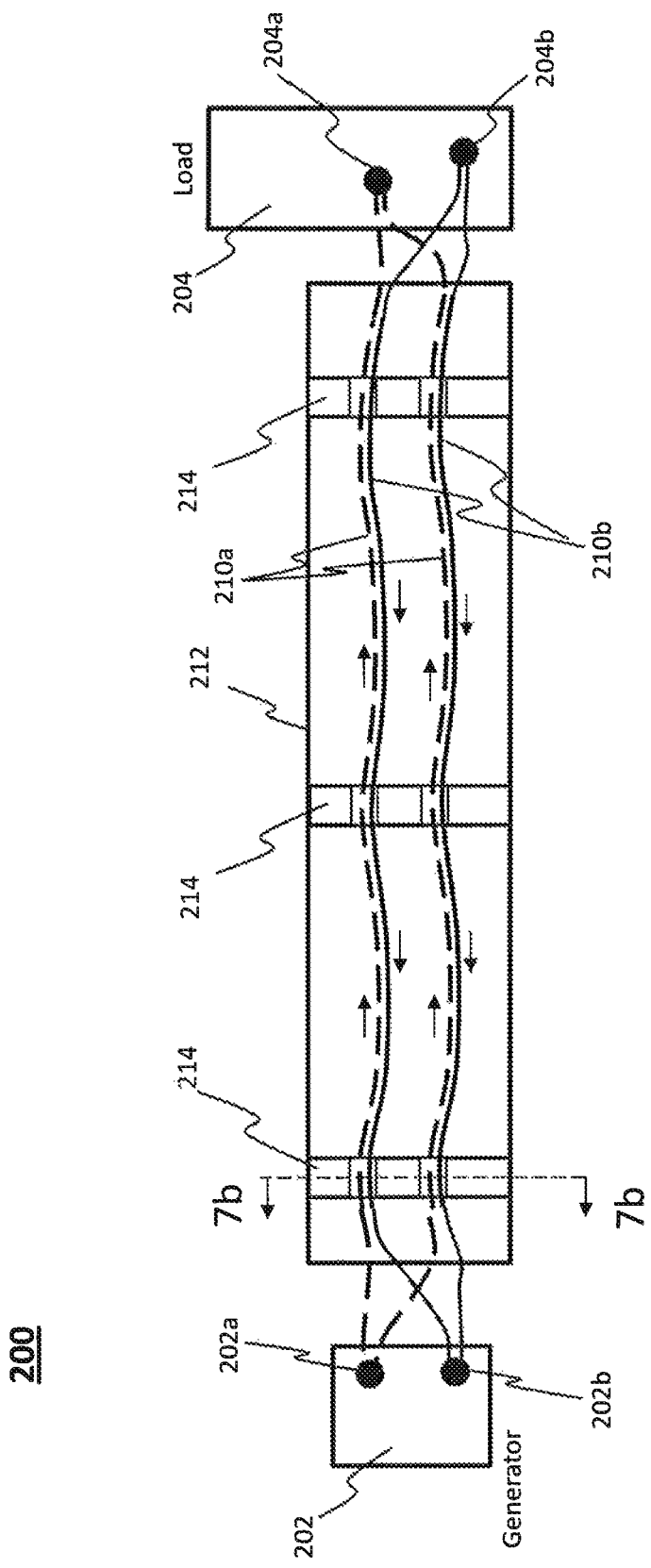
FIG. 7A illustrates a view in cross section of a wiring system according to another embodiment of the invention where a self-field generated during the current carrying mode can be reduced.

The additive field resulting from the parallel current flows can limit the superconducting current carrying capacity. With reference to FIG. 7A, there is shown a view in cross section of wiring system 200 according to another embodiment of the invention. Current runs between a power source 202 and a load 204 in both directions, i.e., from a first terminal 202A of the source to a first terminal 204a of the load, and from a second terminal 202B of the source to a second terminal 204B of the load. The current is transmitted via a series of high temperature superconductor elements 210 which are, for example, provided in tape form, e.g., such as YBCO. The conductors collectively form a transmission line which extends through a cryostat 212 between the source 202 and the load 204. The exemplary cryostat is cylindrical in shape, extending between the source 202 and the load 204. The conductors which connect to the terminals 202A and 204A are designated 210A and the conductors which connect to the terminals 202B and 204AB are designated 210B.

The conductors 210A and 210B are paired in an alternating pattern with the pairs of conductors positioned one over another to provide a pattern 210A, 210B, 210A, 210B, 210A, 210B. Although only two pairs of conductors 210A, 210B are shown in FIG. 7A it is to be understood that an arbitrarily large number of such pairs may be positioned one over the other to provide a large power transmission capacity. A feature of the embodiment is that pairs of conductors with opposite current direction are placed in close proximity with one another so that the self-field generated during the current carrying mode can be significantly reduced and the current carrying capacity of such an assembly significantly increased. The alternating direction of current flow is shown with arrows to indicate opposite directions of current flow among pairs of conductors 210A, 210B. During power transmission the fields generated by these arrangements in the volume surrounding the conductor pairs are reduced in strength and the total fringe magnetic field is reduced.

4. Strain Relief of Superconducting Current Busses

Figure 7B:
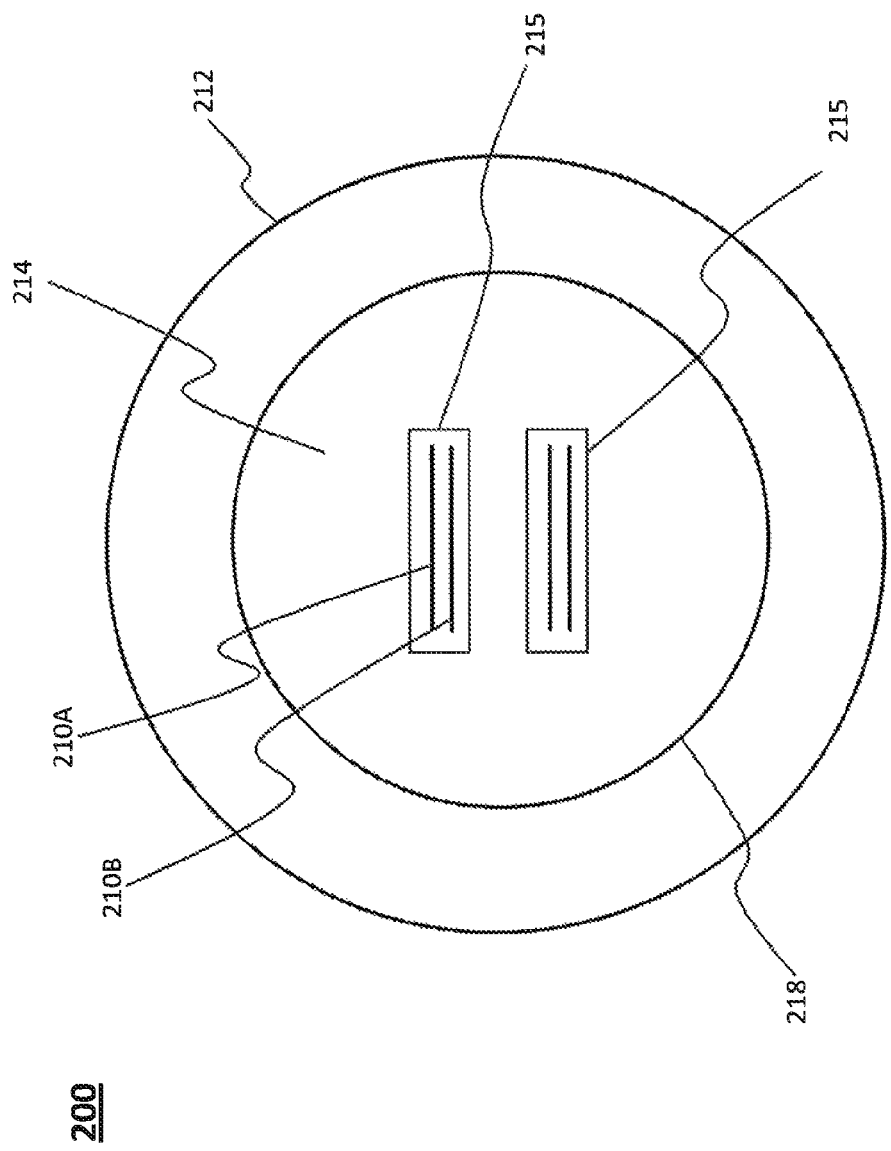
FIG. 7B illustrates an axial view in cross section of the wiring system of FIG. 7A.

With further reference to FIG. 7A as well as FIG. 7B, another feature of the illustrated embodiment is an arrangement for support of the conductors 210A, 210B that avoids stress or strain during the required cooldown of the conductor, typically from room temperature, for operation at a cryogenic temperature. FIG. 7B is an axial view in cross section along the major axis of the cryostat 212. Typical temperatures of such busses ranges from 4.5 K to 77 K. Novel conductors might operate at even higher temperatures. The cooldown of the conductor leads to significant shrinkage in length, due to the rather large temperature transition and the expansion properties of the conductor material. For a conductor length of tens of meters the resulting shrinkage will be in the range of several centimeters. Many superconductors are strain sensitive, i.e., their current carrying capacity is compromised under stress or strain. It is therefore necessary to mount the conductors in such a way that the cooldown can be accommodated without putting mechanical strain or stress on the conductors. The wiring system 200 avoids or eliminates stresses which would result from wiring shrinkage due to cool down, which shrinkage could be on the order of several millimeters per meter. The system 200 includes a series of support structures 214 which constrain the conductors 210 at discrete spaced apart points along, for example, a multi-conductor transmission line 216 comprising many individual ones of the conductors 210A, 210B. The transmission line 216 may serve as the transmission line 70 of FIG. 2. The conductors 210A, 210B in the transmission line 216 are arranged in a stacked configuration within the cryostat 212. For example, each support structure 214 may be fixed to or supported against a wall portion 218 of the cryostat 212 and insulative material may be placed to minimize heat conduction from the chamber wall portion 218 to the conductors.

The support structures 214 may each be in the form of a plate having multiple grooves or slots 215, each suitable for receiving and securing one pair of conductors 210A, 210B. In the illustrated embodiment (see FIG. 7B) a pair of conductors is shown positioned in each groove. The conductors in each pair have current flow in opposite directions with respect to one another. The plates are supported by members (not shown) which extend from the plates to the cryostat wall.

The support structures are spaced appropriate distances apart, e.g., one meter, and the conductors are attached to adjacent support structures in a manner that leaves sufficient slack in each segment of conductor to accommodate thermal shrinkage during cool down. With this arrangement the conductors 210 are able to undergo temperature changes without incurring strain as they reach their final reduced length.

While various embodiments of the present invention have been described, such embodiments are provided by way of example only. Numerous variations, changes and substitutions may be made without departing from the invention herein. Accordingly, it is intended that the invention be limited only by the spirit and scope of the appended claims.

The claimed invention is:

1. A power conversion and distribution system comprising:
   a conversion assembly comprising low voltage source components configured to receive, from a first power source, and convert a relatively high voltage alternating current to a relatively low voltage alternating current and provide a direct current voltage as an output; and
   a transmission line comprising a first segment connected to carry current from the conversion assembly to a load and a second segment connected to carry current from the load to the conversion assembly, wherein the transmission line includes a superconducting magnetic energy storage system;

wherein at least one of the transmission line segments comprises a first solenoid coil configured to function as a superconducting magnetic energy storage component in the superconducting magnetic energy storage system and the first solenoid coil is capable of providing current for operation of the load and avoidance of a power interruption during a time period in which transition is made to an alternate power source in lieu of the first power source.

2. A power conversion and distribution system comprising:
   a conversion assembly comprising low voltage source components configured to receive, from a first power source, and convert a relatively high voltage alternating current to a relatively low voltage alternating current and provide a direct current voltage as an output; and
   a transmission line comprising a first segment connected to carry current from the conversion assembly to a load and a second segment connected to carry current from the load to the conversion assembly, wherein the transmission line includes a superconducting magnetic energy storage system;
   wherein the transmission line comprises a first solenoid coil positioned in-line in the first transmission line segment, between a first power source terminal at the conversion assembly and a first load terminal at the load, to receive current from the conversion assembly and provide the current to the load, the first solenoid coil configured to provide an inductance enabling the transmission line to provide current to the load while transition is made to an alternate power source in lieu of the first power source.

3. The power conversion and distribution system of claim 2 wherein the first solenoid coil provides superconducting magnetic energy storage when the transmission line transmits power to the load.

4. The power conversion and distribution system of claim 2 wherein the transmission line comprises a second solenoid coil positioned in-line in the second transmission line segment, between a second power source terminal at the conversion assembly and a second load terminal at the load, to carry current from the load to the conversion assembly, the second solenoid coil configured to provide an inductance enabling the transmission line to provide current while transition is made to the alternate power source in lieu of the first power source.

* * * * *